March 27, 1934.  C. R. DAVIS  1,952,047
AUTOMATIC DOUGH BRAKE MACHINE
Filed Dec. 1, 1933  4 Sheets-Sheet 1

INVENTOR.
Chester R. Davis.

March 27, 1934.  C. R. DAVIS  1,952,047
AUTOMATIC DOUGH BRAKE MACHINE
Filed Dec. 1, 1933  4 Sheets-Sheet 4

INVENTOR.
Chester R. Davis.

Patented Mar. 27, 1934

1,952,047

UNITED STATES PATENT OFFICE 1,952,047

AUTOMATIC DOUGH BRAKE MACHINE

Chester R. Davis, San Francisco, Calif.

Application December 1, 1933, Serial No. 700,495

3 Claims. (Cl. 107—12)

My invention relates to improvements in machines for preparing beaten dough by a process of alternately rolling and folding a batch of dough; and the objects of my invention are, first, after each passage of the dough thru a set of rolls, to automatically fold the dough in the direction in which it was rolled; second, to then pass the dough thru a set of rolls at right angles to the previous rolling; third, to perform the above operations automatically and continuously for whatever period desired, thereby producing a more thoroly beaten dough, and a lighter and more palatable product.

I attain these objects by mechanism illustrated in the accompanying drawings, in which—

Figure 1:
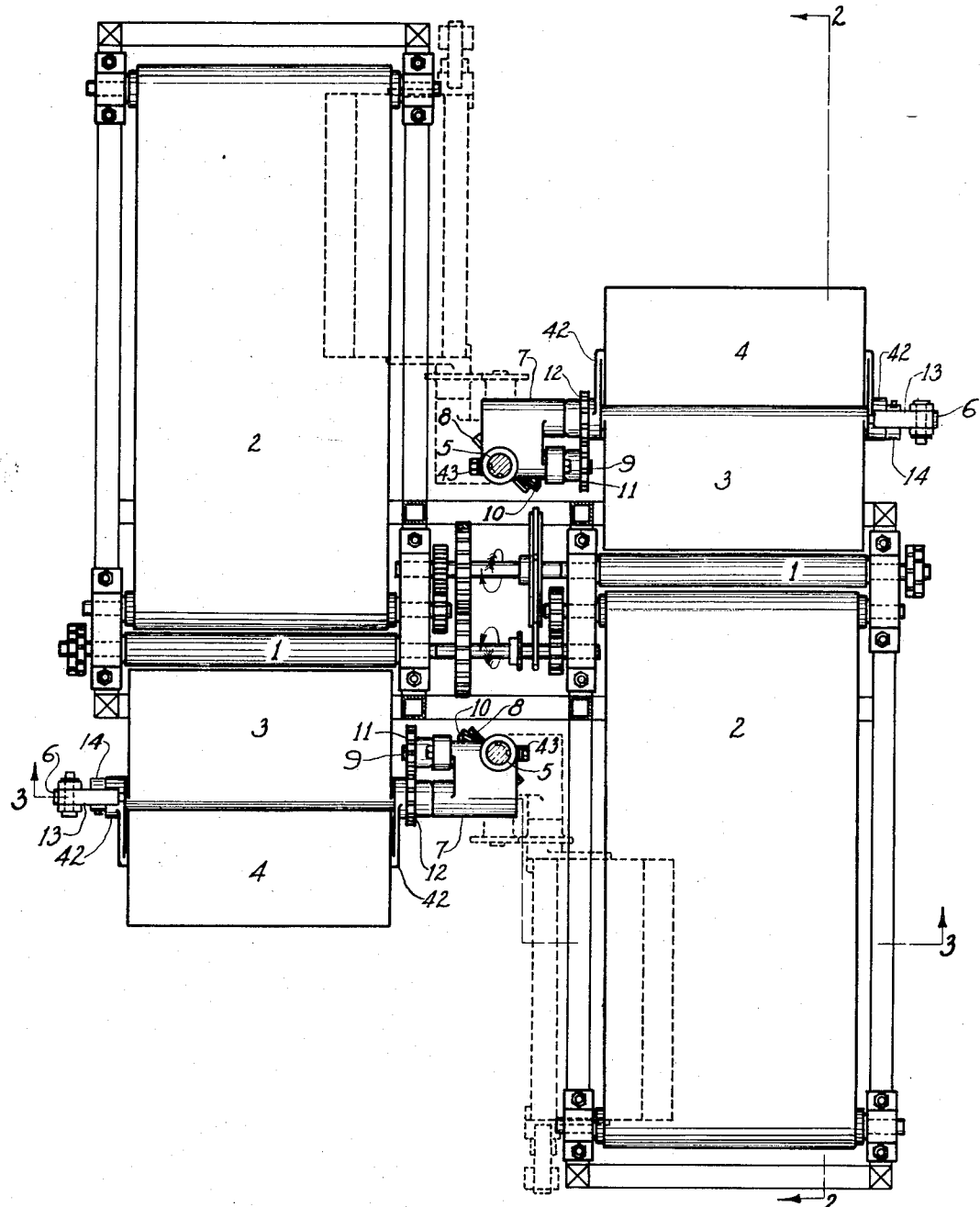
Figure 2:
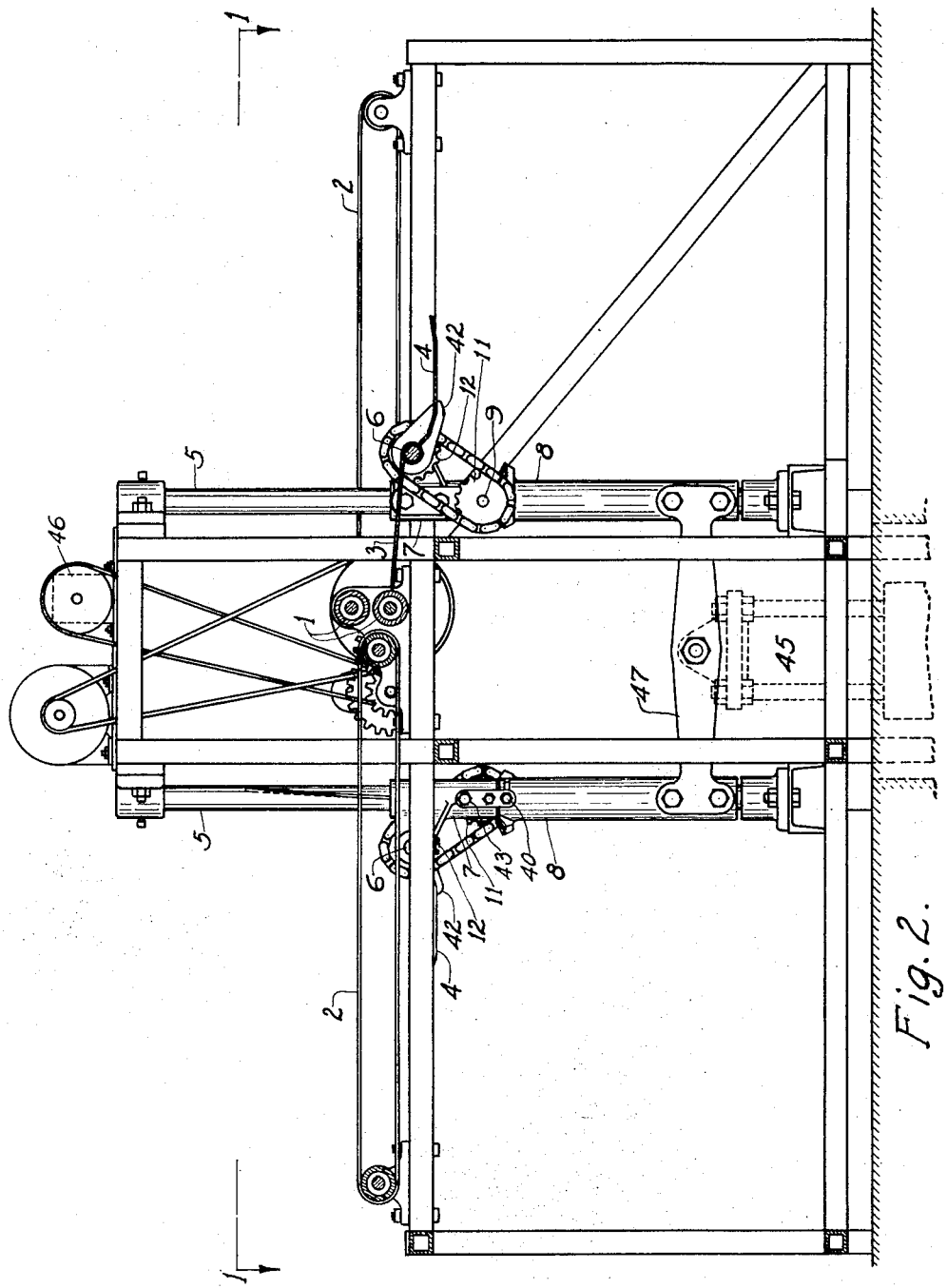
Figure 3:
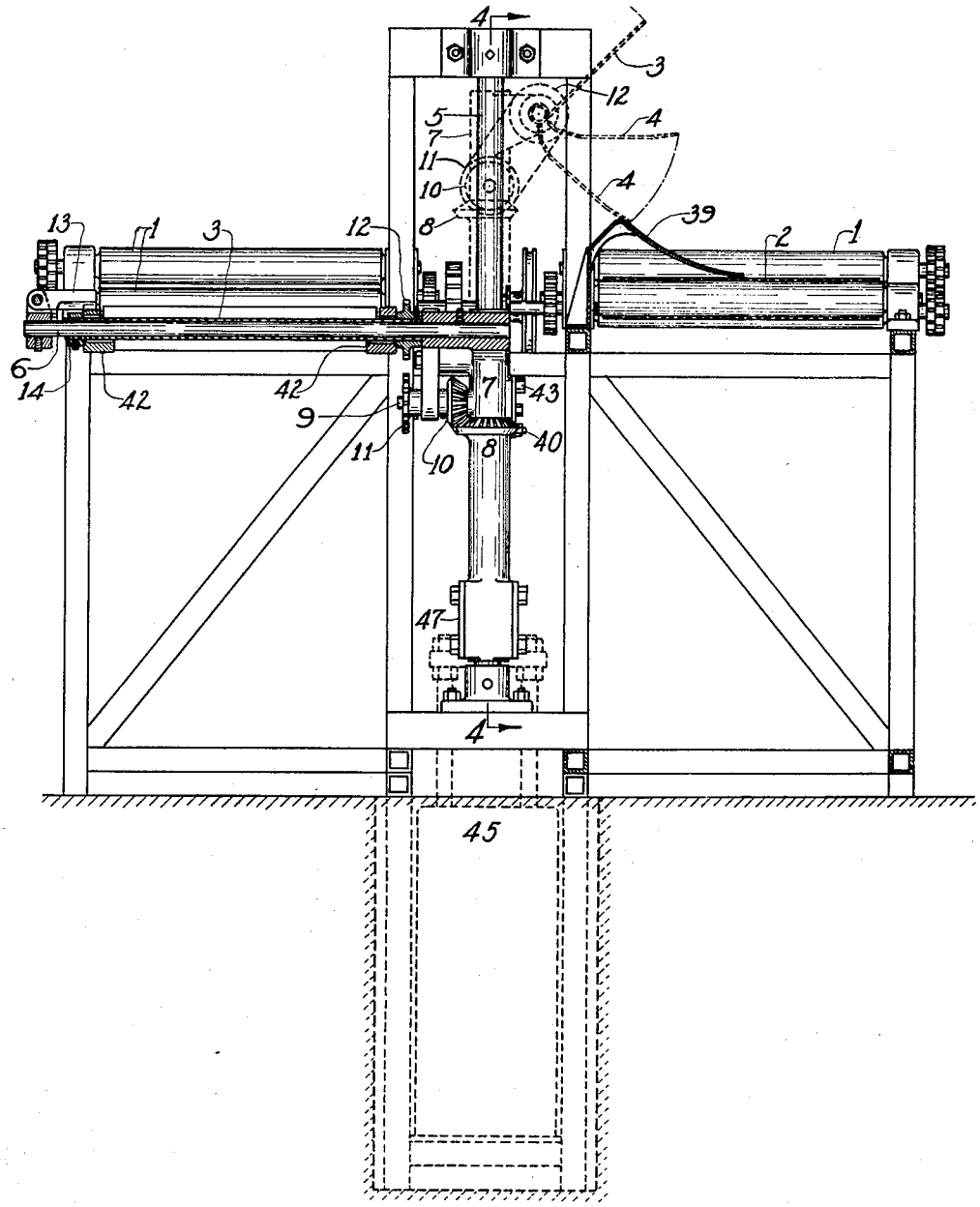
Figures 4, 5:
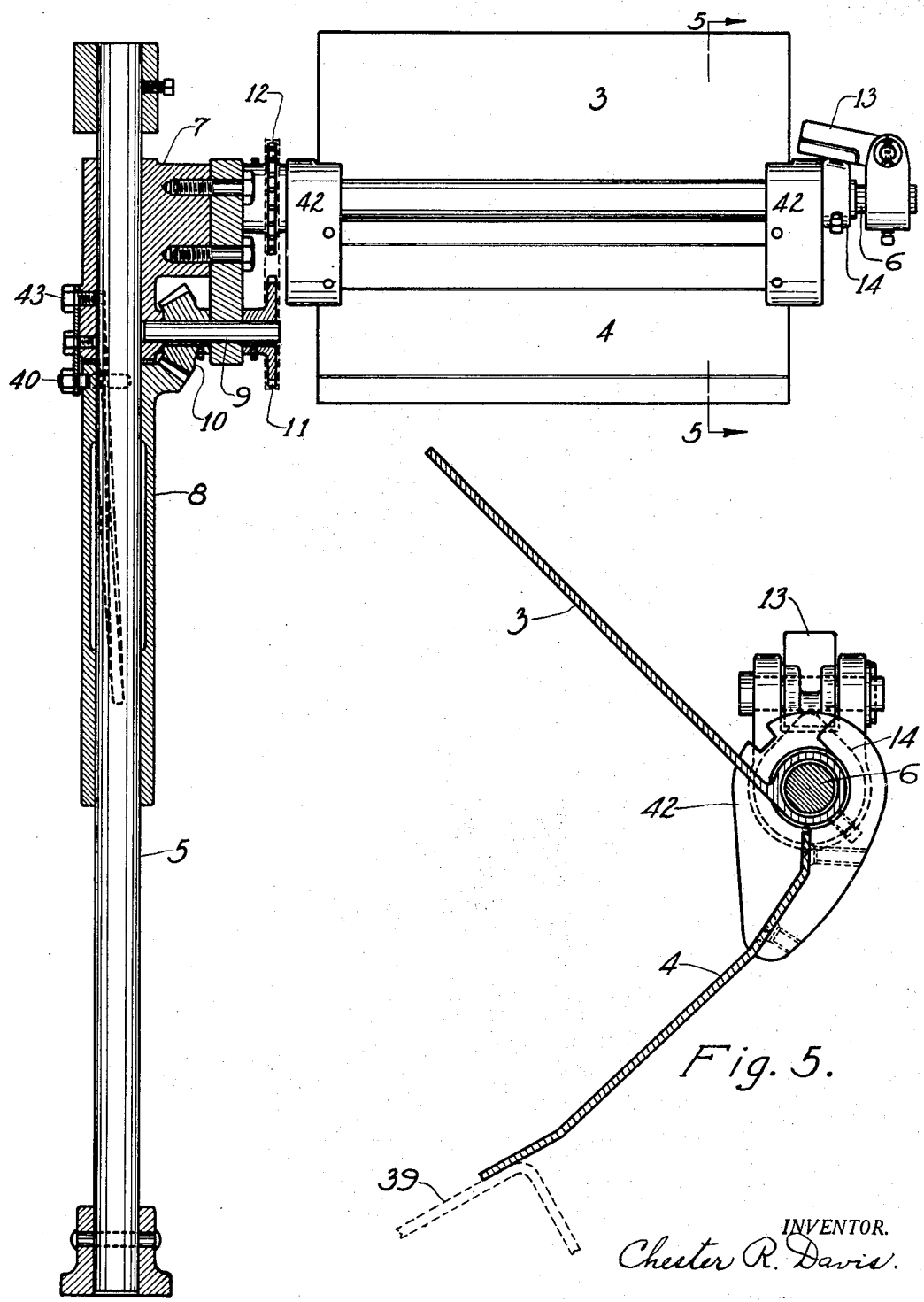

Figure 1 is a plan view of the machine, looking down from the line 1—1, Figure 2; Figure 2 is an elevation of the entire machine, taken along the line 2—2, Figure 1; Figure 3, a vertical section of the machine on the line 3—3, Figure 1; Figure 4, an enlarged detail of a vertical section of the vertical shaft assembly on the line 4—4, Figure 3, with the bevel gear sleeve and tray bracket in their position at the top of their stroke as shown dotted in Figure 3; Figure 5, an enlarged vertical section thru the tray leaves on the line 5—5, Figure 4.

This application is a continuation in part of the original application Serial No. 652,148, filed Jan. 17, 1933.

Similar numerals refer to similar parts thruout the several views.

The machine as shown has two sets of rolls 1, each fed by a canvas belt 2. (Slides or other type of feeder might be used instead.) The dough passes thru either set of rolls onto a tray, which consists of two tray leaves 3 and 4 pivoted at their junction. After the dough comes to rest upon this tray, the tray rises vertically, and at the same time revolves horizontally about a rigidly fixed vertical shaft 5. While the tray is rising vertically and revolving horizontally, the upper leaf 3 is revolving vertically upward and over about the tray shaft 6, folding a portion of the sheet of dough over onto the remaining portion. Figure 3 shows the tray leaves dotted in this folded position. As the limits of these movements are reached, the lower tray leaf 4 suddenly drops, this final position also being shown dotted in Figure 3, and the dough, guided by a suitable sheet metal surface 39, is discharged onto the other canvas belt. The various movements of the tray are then reversed, returning it to its original position, while the dough is fed into the second set of rolls and onto the second tray, which in turn folds the dough and deposits it on the first belt. Greater efficiency is, of course, obtained by operating with two batches of dough. No interference can result, as the two trays move in unison.

The most essential parts of this invention are the tray and the tray bracket 7, which are carried vertically up and down a rigidly fixed vertical shaft 5. By means of a key 43 operating in a spiral groove, which is cut in the vertical shaft 5, the tray bracket 7 is rotated horizontally about the vertical shaft 5, as it is carried upward thereon. The bevel gear sleeve 8, upon which the tray bracket 7 rests, is free to slide vertically up and down, but is held from any rotation about the vertical shaft 5. Near the top of the tray bracket 7, and rigidly fixed thereto, is mounted the tray shaft 6, which carries the tray leaves 3 and 4, and about which shaft these leaves are partially revolved. Near the bottom of the tray bracket 7, and free to rotate therein, is the pinion shaft 9. A bevel pinion 10, keyed to the pinion shaft 9, meshes with a bevel gear segment which is integral with the vertically sliding sleeve 8. In order to insure that the pinion and gear will be continuously in mesh, the tray bracket 7 is connected to the bevel gear sleeve 8 by a pin 40 sliding in a horizontal keyway near the top of the sleeve. As the tray bracket 7 is rotated horizontally, the action between the bevel gear and pinion causes the pinion 10 and its shaft 9 to rotate. On the outer end of this shaft 9 is keyed a chain sprocket 11 which drives a similar sprocket 12 which is rigidly fitted to the upper tray leaf 3, and thereby revolves the upper leaf 3 about the tray shaft 6.

The lower tray leaf 4 is restrained by its mountings 42 from opening more than about 175 degrees from the upper leaf 3. The lower leaf 4 is further prevented from revolving about the tray shaft 6, by a pawl 13 which rests in a notch in the outer mounting 42 of the tray leaf 4. This pawl 13 is supported by a bracket which is rigidly attached to the end of the tray shaft 6. The upper tray leaf 3 is integral with a pipe-like portion which fits over and rotates upon the tray shaft 6. The mountings 42 of the lower leaf 4 are so fitted as to turn freely on this pipe. On the outer end of this pipe is mounted a cam 14 which lifts the pawl 13 and releases the lower tray leaf 4. As the upper tray leaf 3 revolves, in folding the dough, the cam 14 is rotated until, as the end of the movement is reached, the pawl releases the lower tray leaf 4, the leaf falls and swings downward, and the dough is discharged onto the canvas belt. As the sleeve 8 descends, it carries the tray bracket down with it, and the various movements are reversed; the upper tray leaf 3 picks up the lower tray leaf 4 at their maximum angle of about 175 degrees, and the entire tray is returned to its original position.

The raising and lowering of the sleeves 8 at suitable intervals and at a suitable speed, may be accomplished by any one of several means. In the arrangement shown, a commercial device called by the manufacturers thereof a "thrustor", and which is a combination of electric motor and hydraulic pump and pistons, arranged for a vertical lift and gravity return, is connected by a yoke 47 to the sleeves 8. The thrustor motor is switched on and off, as required, by an automatic switch, which is preferably driven from some part of the mechanism as shown at 46 in Figure 2.

I have neither indicated nor specified a flour dusting device to prevent the dough becoming sticky, nor a scraper to prevent the dough adhering to the roll, altho the use of both these devices is contemplated, in connection with this machine. Such flour dusting devices and scraper devices are of many kinds, are in common use and are easy of application, and are not considered a part of any improvements claimed hereunder.

I claim:

1. A dough beating machine with two sets of dough rolls, a feeder to each set of rolls, two mechanically operated trays for receiving and folding the rolled dough and depositing it upon the feeder to the alternate set of rolls, all substantially as shown and described.

2. A dough folding device consisting of the combination of a two-leaved tray carried by a tray bracket pivoted about a vertical axis, and mounted on said bracket a horizontal shaft with a bevel pinion thereon, which pinion is in mesh with a bevel gear centered on the said vertical axis and so arranged that a rotative movement of the bracket, relative to the bevel gear, will rotate the pinion shaft, and by a drive therefrom will rotate one of the tray leaves about a horizontal axis, substantially as shown and described.

3. A dough beating machine with two sets of rolls, a feeder to each set of rolls, two two-leaved trays arranged to receive the dough from the rolls, one leaf of each tray being integral with a pipe-like portion which fits over and turns on a horizontal shaft, the other leaf being carried by mountings which fit over and turn upon the said pipe-like portion, a bracket supporting each of the said two-leaved trays, two vertical shafts on each of which one of the said brackets is mounted, each of the brackets carrying a horizontal shaft with a bevel pinion thereon, which pinion is in mesh with a bevel gear mounted on the said vertical shaft and free to slide vertically thereon but not free to rotate; a guideway cut in the surface of the said vertical shaft at an angle to the longitudinal axis thereof, a key in the said bracket arranged to follow the said guideway and give to the said bracket a rotative movement about the vertical shaft when the bevel gear and the bracket are moved up or down thereon; a chain drive from the said horizontal pinion shaft to the pipe-like portion of one of the tray leaves, all substantially as shown and described.

CHESTER R. DAVIS.